United States Patent [19]

Lemelson

[11] 3,812,287

[45] May 21, 1974

[54] VIDEO DETECTION SYSTEM

[76] Inventor: Jermone H. Lemelson, 85 Rector St., Metuchen, N.J. 08840

[22] Filed: Oct. 24, 1972

[21] Appl. No.: 300,249

Related U.S. Application Data

[63] Continuation-in-part of Ser. No. 823,600, May 12, 1969, Pat. No. 3,705,953, which is a continuation-in-part of Ser. No. 723,075, Feb. 28, 1958, Pat. No. 3,084,213.

[52] U.S. Cl. .......................... 178/6.8, 178/DIG. 38

[51] Int. Cl. .......................................... H04n 7/18

[58] Field of Search............ 178/DIG. 33, 7.83, 6.8, 178/DIG. 1, DIG. 4, DIG. 38; 235/61.6 A; 250/217 CR; 315/10

[56] References Cited

UNITED STATES PATENTS

| | | | |
|---|---|---|---|
| 2,553,729 | 5/1951 | St. Marie | 178/DIG. 4 |
| 2,540,144 | 2/1951 | Stern | 250/217 CR |
| 2,959,349 | 11/1960 | Marsh | 315/10 |
| 3,072,818 | 1/1963 | Raffensperger | 315/10 |
| 3,536,831 | 10/1970 | Kanemaki | 178/DIG. 33 |
| 3,600,512 | 8/1971 | Crayton | 178/7.83 |

*Primary Examiner*—Howard W. Britton

[57] ABSTRACT

An apparatus and method are provided for automatically detecting a change in an image field such as the appearance of an object in said field or the disappearance of said object. The apparatus which employs a television camera scanning the image field and which generates a video picture signal which is applied to a remote cathode ray tube to provide an image of the field on the screen thereof, may be employed for security purposes to automatically detect images in the image field. An alarm is sounded when one or more particular portions of the image field vary in content.

3 Claims, 4 Drawing Figures

VIDEO DETECTION SYSTEM

RELATED APPLICATIONS

This is a continuation-in-part of application Ser. No. 823,600 which was filed on May 12, 1969 for Automatic Communication System now U.S. Pat. No. 3,705,953 having as a parent application Ser. No. 723,075 filed on Feb. 28, 1958 for Facsimile Apparatus now U.S. Pat. No. 3,084,213.

SUMMARY OF THE INVENTION

This invention relates to an apparatus for automatically detecting variations or changes in an image field and for generating an alarm upon said automatic detection. The invention provides a simple system which includes a television camera, and a remote monitor of the area scanned by the camera which monitor is connected to receive television picture signals from the camera and generate an image on its image screen. Disposed to scan a particular area of the image screen of television monitor is a photoelectric cell which is adjusted to either generate an output detection signal when a portion of the field it is scanning changes an image content such as when an object enters that portion of the field, an object or material is removed from the field or some other phenomenon is therein such as the appearance of fire or smoke. The photoelectric cell is connected to a photoelectric controller which either generates an output signal upon the occurrence of a change in the portion of the image field being scanned by the photoelectric cell or ceases to generate a constantly generated output signal when said image change occurs.

Before the making of the instant invention, various burglar and fire alarm systems were employed to detect the entry of persons on property and to sense the presence of fire. These systems have the distinct advantage that, while they are sufficient to detect that which they are aligned to detect, the exact occurrence cannot be monitored remotely to determine exactly what is happening. The instant invention corrects such shortcoming providing a system which will both detect the presence of a foreign body or person on property and/or fire on the property, sound an alarm and permit the remote monitoring of the phenomenon occurring at a remote location so that suitable action may be taken by a person monitoring the changing effect.

Accordingly, it is a primary object of this invention to provide a new and improved apparatus for remotely detecting and monitoring changes in an image field such as the appearance or disappearance of objects therein, movement of an object, the presence of fire or smoke or other phenomenon.

Another object is to provide a closed circuit television system which is operable to permit the automatic detection of changes in an image field which may occur and require further monitoring.

Another object is to provide an automatic security and detection system employing simple means which may be easily varied to detect changes or variations in different locations of an image field scanned in accordance with changing requirements of the system.

Another object is to provide a closed circuit television system with auxiliary detection means applicable to a monitor screen of a television receiver of the system for automatically detecting and remotely or locally indicating when movement or changes occur in a selected portion or portions of the field scanned by a television camera.

Another object is to provide a simple security system employing closed circuit television and a technique for detecting changes in the image field being scanned by a television camera employed in the system without the need for logical electrical circuitry or a computer.

With the above and such other objects in view as may hereafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

Figures 1, 2, 3, 4:
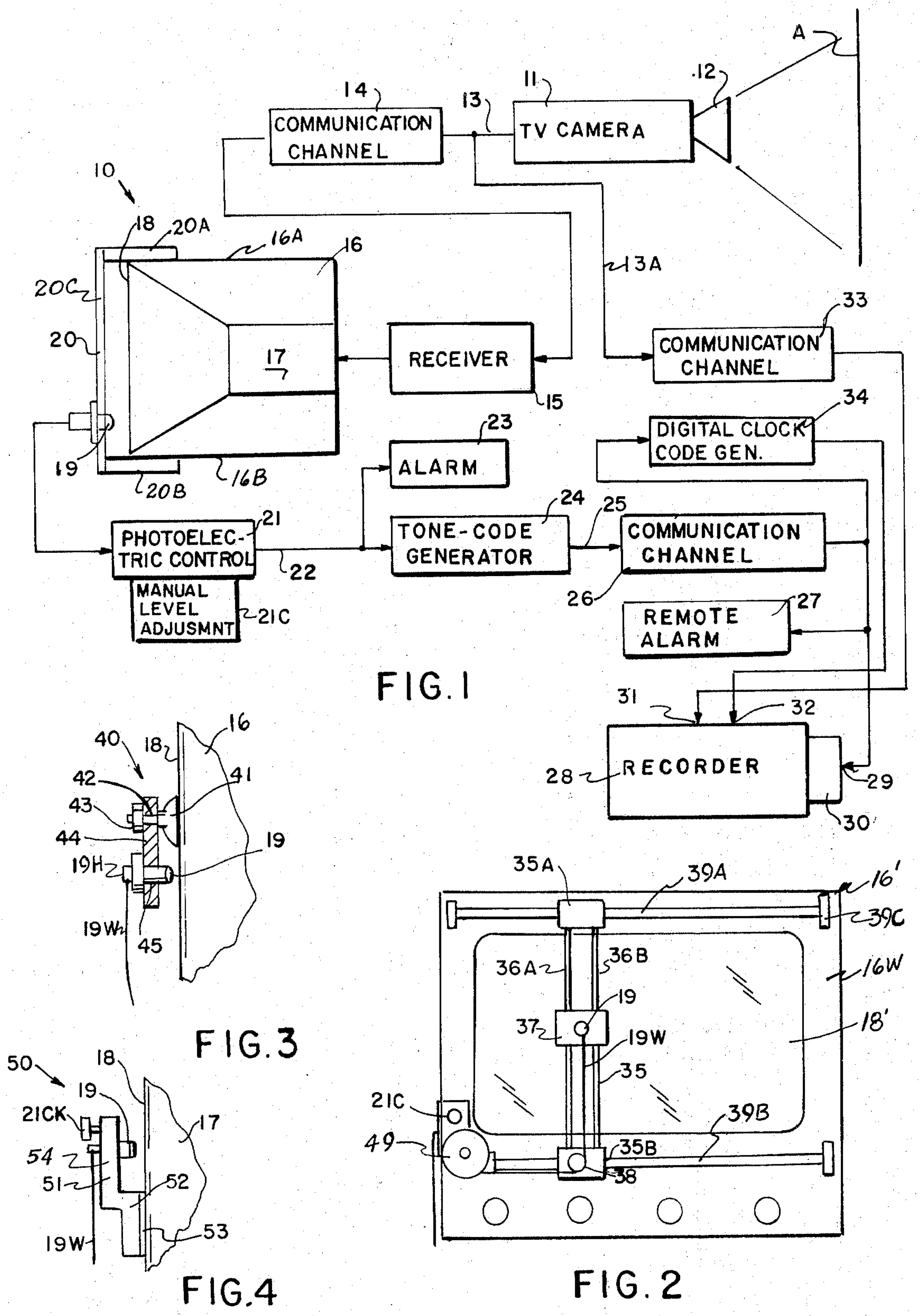
FIG. 1 is a schematic diagram of the components and subsystems employed in the surveillance system of the invention.
FIG. 2 is a front view of a television receiver-monitor and scanning apparatus for its screen employed in the system.
FIG. 3 is a side view of a television receiver and a modified mount for a detector of image information on the screen of the receiver.
FIG. 4 shows a modified form of the apparatus of FIG. 3 in side view.

In FIG. 1 is shown an area surveillance system 10 for automatically detecting changes in an area A under surveillance such as the appearance of an object or other image variation in a particular portion of the surveyed area. Provided on a mount which is fixed with respect to the area A is a television camera 11 of suitable resolution and containing a suitable lens system 12 for scanning and generating television picture signals on an output 13, which signals are representative of the area scanned.

The video signals generated are transmitted on a communication channel 14 such as a coaxial cable, microwave link or by short wave to a receiver 15 which is connected a video display 16 such as a television cathode ray tube with suitable control circuitry 17 for causing the generation of images on the display screen 18 thereof in accordance with the characteristics of the video signals received by the receiver 15.

Provided on a mount 20 is a photoelectric cell 19 which is disposed immediately adjacent a selected portion of the display screen 18 to receive light generated thereby. The portion of screen 18 scanned by cell 19 is preferably that portion generating an image of the area A scanned by camera 11 which image may change with time in such a manner as to increase or decrease the amount of light passed to the photoelectric cell 19 a degree to cause a corresponding change in the output of said cell which is passed to an amplifier and photoelectric control 21 of conventional design. When the output of cell 19 varies a predetermined degree from a set value indicative that a change is occurring in the portion of the image field scanned by the cell, a signal is generated on the output 22 of photoelectric control 21. This signal is applied to activate a first alarm 23 such as a lamp, buzzer or bell located in the vicinity of television receiver 16. If a plurality of such receivers are utilized with respective display screens operable to display information generated by different television cameras scanning different areas of a floor or different floors of a building, the alarm 23 is preferably located adjacent to its particular television receiver 16 and includes a lamp in addition to a bell or buzzer with the lamp positioned immediately adjacent the screen 18 so as to indicate to the person monitoring all screens, which display screen contains the changing information which caused the output to be generated by the photoelectric control of the photoelectric cell which detected the change in image content.

The mount 20 contains legs 20A and 20B which respective engage or fasten to the upper and lower walls 16A and 16B for the housing of the television receiver 16 and may be adjustably positioned laterally therealong to position the photoelectric cell 19 at different lateral locations across the face or screen 18 of the receiver. The photoelectric cell 19 itself is capable of being secured to various locations of the vertical bar 20C of the mount 20 so that its scanning axis may be disposed and retained in alignment with any selected area of the face of the tube or display screen 18. The scanning cell 19 may be located on mount 20 so as to be aligned with and scan the image of a door, which when opened, causes a change in the light emitted by the phosphors of the screen 18 in alignment with the cell 19. (e.g. background light passing through the open door or a reduction in light therebeyond causes a reduction in the amplitude of the video signal generated by camera 12 when its read beam scans the area containing the open door.

The photoelectric control 21 is preferably manually adjustable to generate an output signal when different degrees of light intensity are received thereby so that the level of light which is required to effect an output signal on line 22 may be adjustably varied by the person setting up the surveillance system. The output 22 of the photoelectric control 21 also is connected to a code or tone generator 24 having an output 25 which is connected by means of a first communication channel 26 to a remote alarm 27 and to the input 29 of a control 30 for an automatically operable video-tape recorder 28. When activated by the signal generated by tone generator 24 the control 30 which includes a relay responsive to said tone signal, initiates operation of the video-tape recorder 28 by powering the tape transport motors thereof and the recording heads to record signals received directly from the television camera 11. The output 13 of camera 11 is connected to a branch circuit 13A which is connected by means of a cable or short wave communication channel 33 to an input 31 of the recorder 28 which input is connected to the magnetic recording head of the recorder which records the video picture signals generated thereafter by the television camera.

Communication channel 26 is also connected to a digital clock code generator 3 which includes a relay therein which is responsive to the tone signal generated when generator 24 becomes energized. The output of clock code generator is a series code signal representative of time which is transmitted to a second input 32 of recorder 28 which is connected to a recording head thereof scanning the channel of the tape adjacent the video channel on which the video signals are recorded so that a code is recorded thereon in a location which indicates the signal recorded which contains the image information which changed from those television picture signals which were generated prior to those signals which caused the photoelectric control to become energized by a change in image content of the screen scanned by cell 19.

The photoelectric control 21 preferably contains a relay such as a thyratron tube or its solid state equivalent which fires, generating the required output pulse to energize the tone code generator 24 when light received thereby from the particular area of the face of the tube or screen 18 either falls below or increases above a predetermined level in accordance with adjustment effected of a manually adjustable level control 21C such as a variable resistor forming part of the circuit 21. The person monitoring the operation may thus preset the control 21 so that the alarm 23 and code generator 24 will become activated when a predetermined variation occurs in the image field (e.g. that portion of the image field aligned with the photocell 20) such as the appearance of an object or person having an image which is darker than the background light (e.g. light from a lamp or reflected off a white wall) or lighter than background light such as when a door opens exposing a hall light or daylight to the television camera.

FIG. 2 illustrates a modified form of mount for adjustably positioning a photoelectric cell of the type described in alignment with a selected area of a viewing screen of a television monitor 16′. The mount 35 is composed of a pair of rods 36A and 36B supported at their ends by blocks 35A and 35B which retain said rods parallel to each other so that a third block 37 containing parallel holes bored therethrough, may frictionally slide along the parallel rods. The scanning photoelectric cell 19 is show supported in a hole through the center of block 37 and is located so that its lens is disposed immediately off the surface of the image viewing screen 18′of the television monitor 16′.

The blocks 35A and 35B each frictionally and slidably engage respective rods 39A and 39B which extend parallel to each other and are fastened above the front wall 16W of the monitor 16′ by brackets 39C at the ends of said rods. Thus block 37 and photoelectric cell supported thereby may be slidably adjusted to permit the cell to scan any selected area of the image screen 18′ of the television monitor. Extending from the photoelectric cell 19 is a flexible wire cable 19W containing power leads and the output line for the cell. The cable 19W extends around a pulley 38 mounted on the block 35B and extends therefrom to a self winding take-up reel 49 supported at the side of the front wall 16W. From reel 49, the circuits extend to the described photoelectric control and power supply for the photoelectric cell.

FIG. 3 shows a modified mount for the described photoelectric cell 19. The mount assembly, denoted 40, comprises a suction cup 41 in the neck of which is secured a bolt 42 which retains a bar 44 to the suction cup by passing through a hole in the bar and assemblying a nut 43 to the end of the bolt. The housing 19H for the photoelectric cell 19 is secured within a second hole 45 extending through the bar 44 so that the photoelectric cell's input lens is positioned immediately adjacent the face or screen 18 of the cathode ray tube of the video display 16.

FIG. 4 shows another means for adjustably securing a photoelectric cell of the type described against the face 18 of a video display such as a television receiver monitor. The mount assembly 50 includes a housing 51 with a base 52 containing a flange 53 having pressure sensitive adhesive thereon which retains the housing 51 against a selected portion of the face 18 so that the photoelectric cell 19 which is secured to a portion 54 of the housing 51 which is disposed off the surface of face 18, may be positionally aligned with a selected portion of the face of the video monitor screen for the purpose described. Also supported within housing 51 is a variable potentiometer (not shown) having an output adjustable shaft 21CK which may be manually turned to vary the point at which the photoelectric control 21 will trigger, (e.g. the degree of light energy received by the photoelectric cell which will cause the control thereof to generate an output signal which may be utilized to trigger an alarm and effect recording as described.)

By employing any of the adjustment means hereinbefore described and illustrated in the drawings, a person setting up the security or surveillance system of this invention may first direct the television camera to scan a selected area of a room, yard, aisle or other area, lock the camera on its mount and then adjustably position the photoelectric cell to scan a selected portion of the image screen such as the image of a door, window, aisle or other portion of the image field in which a change may occur, then adjust the photoelectric control to generate an output signal or to close a switch or open a switch when a predetermined degree of light increases the intensity of the image on the screen or a decrease is had therein so as to permit the automatic detection and indication of such change as described.

I claim:

1. An electronic system comprising in combination:

a television camera operable to scan an image field which may change in content with time, a television receiver operable to receive the television signals generated by said camera and including an image screen for generating a viewable image of the information scanned by said camera, a photoelectric cell, a photoelectric control operatively connected to said photoelectric cell and operable to generate an electrical signal when the light intensity falling on said photoelectric cell reaches a predetermined level, means for positioning and retaining said photoelectric cell fixed with respect to said receiver and in a location such that it will receive light from a predetermined area of said image screen so as to permit said cell to detect variations in the light generated at said predetermined area of said screen in accordance with variations in the corresponding area of the image field scanned by said television camera to thereby serve as the detector of said variations, a recorder operable to receive television signals generated by said television camera, means for controlling the operation of said recorder including control means operatively connected to said photoelectric control and operable in response to said electrical signal generated thereby when the light received by said photoelectric cell reaches said predetermined level so as to effect the operation of said recorder to record the output of said television camera and to provide a record of the image field scanned by said camera during at least part of the time said light from said predetermined area of said image screen falling on said photoelectric cell is at said predetermined level.

2. An electronic system in accordance with claim 1 including means responsive to said electrical signal generated by said photoelectric control for effecting a recording in said recorder of a signal which is indicative of detection by said photoelectric cell of a variation in the image content of the field scanned by said camera.

3. An electronic system in accordance with claim 2 wherein said means responsive to said electrical signal generated by said photoelectric control includes a digital code signal generator operatively connected to the recording input of said recorder for generating and transmitting code signals, when activated by the signal output of said photoelectric control, to said recorder which code signals are indicative of the time when said photoelectric cell detects when light from that portion of the image screen of said television receiver reaches said predetermined level.

* * * * *